US008970118B2

(12) United States Patent
Pan et al.

(10) Patent No.: US 8,970,118 B2
(45) Date of Patent: Mar. 3, 2015

(54) LED LIGHTING TUBE

(71) Applicant: Luxul Technology Incorporation, New Taipei (TW)

(72) Inventors: Cheng-Hung Pan, New Taipei (TW); Perng-Fei Yuh, New Taipei (TW)

(73) Assignee: Luxul Technology Incorporation, New Taipei (TW)

( * ) Notice: Subject to any disclaimer, the term of this patent is extended or adjusted under 35 U.S.C. 154(b) by 0 days.

(21) Appl. No.: 13/949,313

(22) Filed: Jul. 24, 2013

(65) Prior Publication Data

US 2014/0197748 A1 Jul. 17, 2014

(30) Foreign Application Priority Data

Jan. 15, 2013 (TW) ............................. 102101453 A

(51) Int. Cl.
*H02H 7/125* (2006.01)
*H05B 33/08* (2006.01)

(52) U.S. Cl.
CPC .................................. *H05B 33/0809* (2013.01)
USPC .......................... 315/187; 315/185 R; 363/54

(58) Field of Classification Search
CPC ................................ H02H 7/125; H05B 37/02
USPC ......... 315/120, 130, 187, 185 R, 192; 363/54
See application file for complete search history.

(56) References Cited

U.S. PATENT DOCUMENTS

| | | | | | |
|---|---|---|---|---|---|
| 3,622,837 | A * | 11/1971 | Gellman | ................. | 315/209 SC |
| 3,719,777 | A * | 3/1973 | von Reichenbach | ........... | 348/61 |
| 4,592,763 | A * | 6/1986 | Dietz et al. | ........................ | 95/26 |
| 6,442,051 | B1 * | 8/2002 | Ryan et al. | ....................... | 363/87 |
| 8,742,681 | B2 * | 6/2014 | Kitamura | ...................... | 315/291 |
| 2008/0074910 | A1 * | 3/2008 | Casteel et al. | .................. | 363/54 |
| 2010/0026208 | A1 * | 2/2010 | Shteynberg et al. | .......... | 315/297 |
| 2012/0019156 | A1 * | 1/2012 | Jin | ............................... | 315/187 |
| 2012/0319587 | A1 * | 12/2012 | Pokrajac | ....................... | 315/122 |
| 2013/0099670 | A1 * | 4/2013 | Jin | ............................... | 315/120 |

* cited by examiner

*Primary Examiner* — Douglas W Owens
*Assistant Examiner* — Wei Chan
(74) *Attorney, Agent, or Firm* — Alan D. Kamrath; Kamrath IP Lawfirm, P.A.

(57) ABSTRACT

The LED lighting tube compatible with an electronic ballast has two snubber circuits, a waveform conversion circuit, and at least one LED light string. The snubber circuits are connected to terminals of the LED lighting tube, and input terminals of each snubber circuit are connected to electrode pins of a corresponding terminal. Each snubber circuit has at least one resistor connected in series between the electrode pins of the corresponding terminal. The waveform conversion circuit has multiple rectifier diodes, and input terminals of the waveform conversion circuit are respectively connected to output terminals of the snubber circuits, with a recovery time of each rectifier diode being under 2.5 us. Two ends of the at least one LED light string are respectively connected to output terminals of the waveform conversion circuit, and each one of the at least one LED light string includes multiple LED units connected in series.

24 Claims, 4 Drawing Sheets

LED LIGHTING TUBE

CROSS-REFERENCE TO RELATED APPLICATIONS

This application claims the benefit of Taiwan patent application No. 102101453, filed on Jan. 15, 2013, the disclosure of which is incorporated herein in its entirety by reference.

BACKGROUND OF THE INVENTION

1. Field of the Invention

The present invention relates to an LED lighting tube and, more particularly, to an LED lighting tube compatible with an electronic ballast having a preheat current.

2. Description of Related Art

With reference to FIG. 2, a conventional fluorescent tube 60 is a gas-discharge lamp, and, accordingly, filaments 62 mounted in a tube 61 of the fluorescent tube 60 has to be heated to ionize gas in the tube 61 before the fluorescent tube 60 begins to glow.

In general, the fluorescent tube 60 has a first terminal L and a second terminal N respectively mounted on two ends of the fluorescent tube 60 and respectively connected to AC output terminals of an electronic ballast 70. The first terminal L has two electrode pins L1, L2 and the second terminal N has two electrode pins N1, N2. Two filaments 62 are mounted in the tube 61 and respectively connected in series between the electrode pins L1, L2 and between the electrode pins N1, N2. When the fluorescent tube 60 connected to a rapid start ballast or a program start ballast is turned on, the ballast produces preheat currents to the first terminal L and the second terminal N. After the preheat currents flow through and heat the filaments 62 to ionize the gas in the tube 61, the fluorescent tube 60 starts to glow.

Currently, an LED lighting tube has a structure of the first terminal L and the second terminal N of the fluorescent tube 60 in order to be compatible with a conventional fluorescent tube holder. An LED unit is mounted in the LED lighting tube and is used as a light source of the LED lighting tube. Two ends of the LED unit are respectively connected to the first terminal L and the second terminal N to obtain a power supply. However, the LED lighting tube does not have a structure of the filaments 62, such that there is no impedance (filaments 62) between the electrode pins L1, L2 of the first terminal L, and between the electrode pins N1, N2 of the second terminal N. Therefore, if the LED lighting tube is directly mounted in a fluorescent tube holder having a rapid start ballast or a program start ballast, the electronic ballast 70 produces short-circuit currents respectively to the electrode pins L1, L2 and to the electrode pins N1, N2 when the LED lighting tube is switched on. The electronic ballast 70 and the LED lighting tube may be damaged due to the short-circuit currents.

SUMMARY OF THE INVENTION

The main objective of the invention is to provide an LED lighting tube compatible with an electronic ballast having a preheat current.

The LED lighting tube comprises:

two terminals, with each terminal having two electrode pins;

two snubber circuits respectively connected to the two terminals, with two input terminals of each snubber circuit respectively connected to two electrode pins of a corresponding terminal, with each snubber circuit having at least one resistor connected in series between the two electrode pins of the corresponding terminal to avoid a short circuit due to no impedance between the two electrode pins;

a waveform conversion circuit having multiple rectifier diodes, with input terminals of the waveform conversion circuit respectively connected to the output terminals of the snubber circuits, and with a recovery time of each rectifier diode being under 2.5 us; and at least one LED light string, with two ends of the at least one LED light string respectively connected to output terminals of the waveform conversion circuit, and with each one of the at least one LED light string comprising multiple LED units connected in series.

A user mounts the LED lighting tube in a conventional fluorescent tube holder and turns on the power. Due to the snubber circuits, at least one resistor is connected in series between two electrode pins of each terminal. An electronic ballast having a preheat current regards the at least one resistor as a filament of a conventional fluorescent tube. That is, the at least one resistor simulates the filament of the fluorescent tube. The preheat current flows through the at least one resistor. Therefore, the preheat current is restricted by the at least one resistor, and there is an impedance between two electrode pins of each terminal to avoid a short-circuit current damaging the electronic ballast and the LED lighting tube.

DETAILED DESCRIPTION OF THE PREFERRED EMBODIMENTS

Figure 1A:
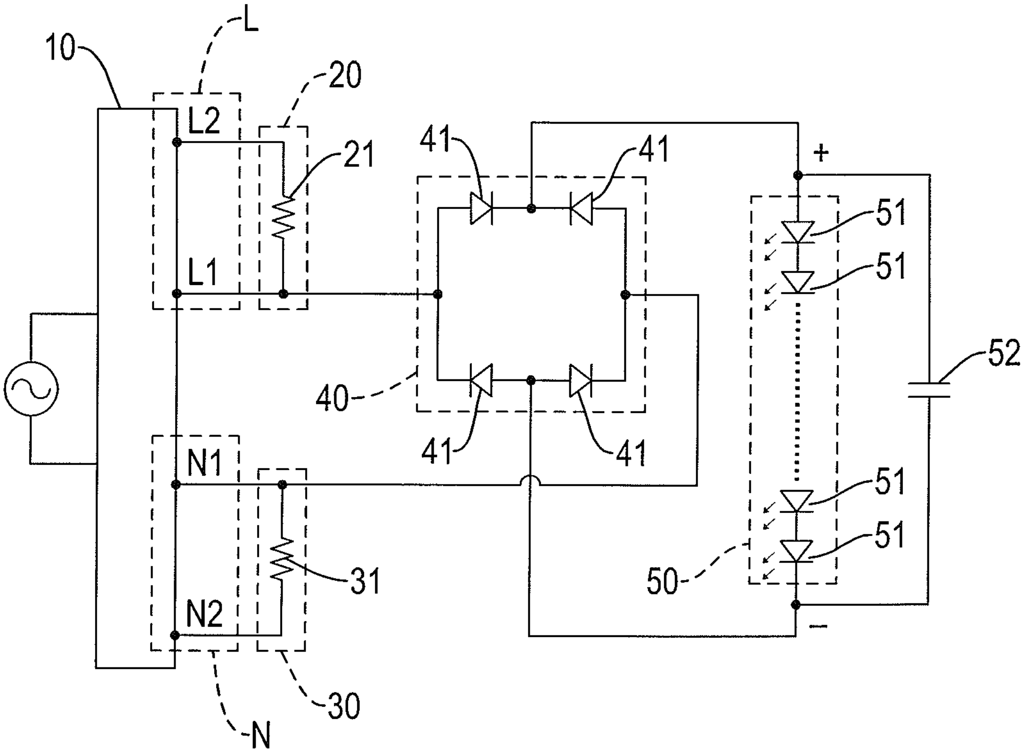
FIG. 1A is a circuit diagram of a first embodiment of an LED lighting tube in accordance with the present invention.

With reference to FIG. 1A, an input terminal of an electronic ballast 10 is connected to an AC power (60 HZ). The electronic ballast 10 has four AC output terminals respectively connected to electrode pins L1, L2, N1, N2 of a first terminal L and a second terminal N.

An LED lighting tube in accordance with the present invention has a first snubber circuit 20, a second snubber circuit 30, a waveform conversion circuit 40, and an LED light string 50.

Figure 1B:
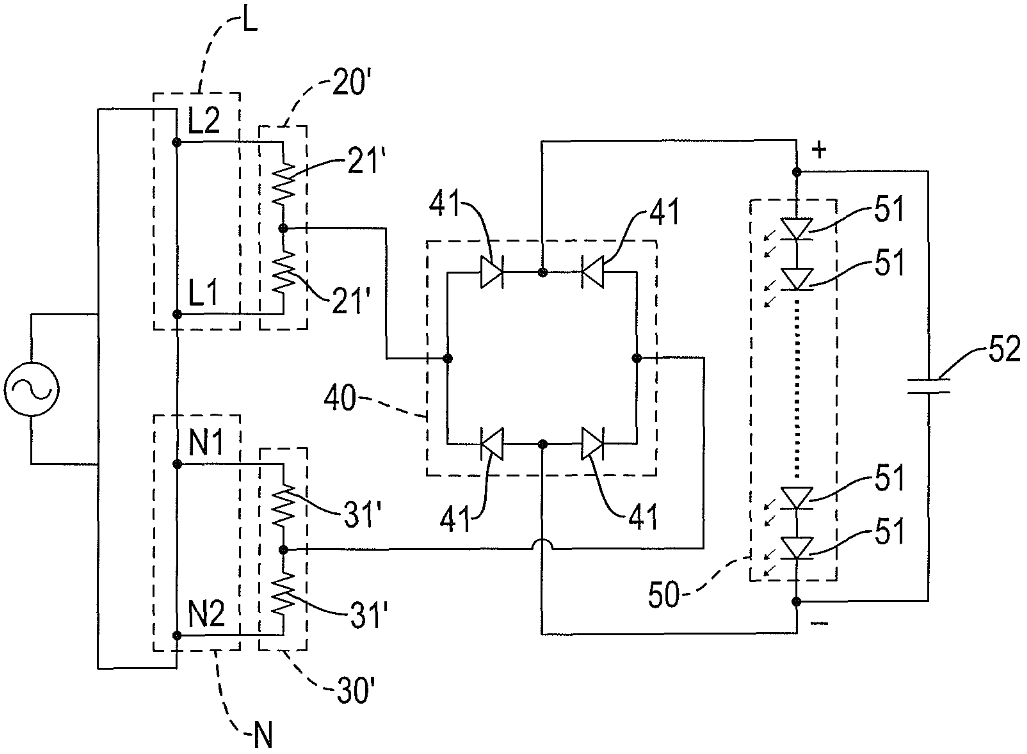
FIG. 1B is a circuit diagram of a second embodiment of an LED lighting tube in accordance with the present invention.
Figure 1C:
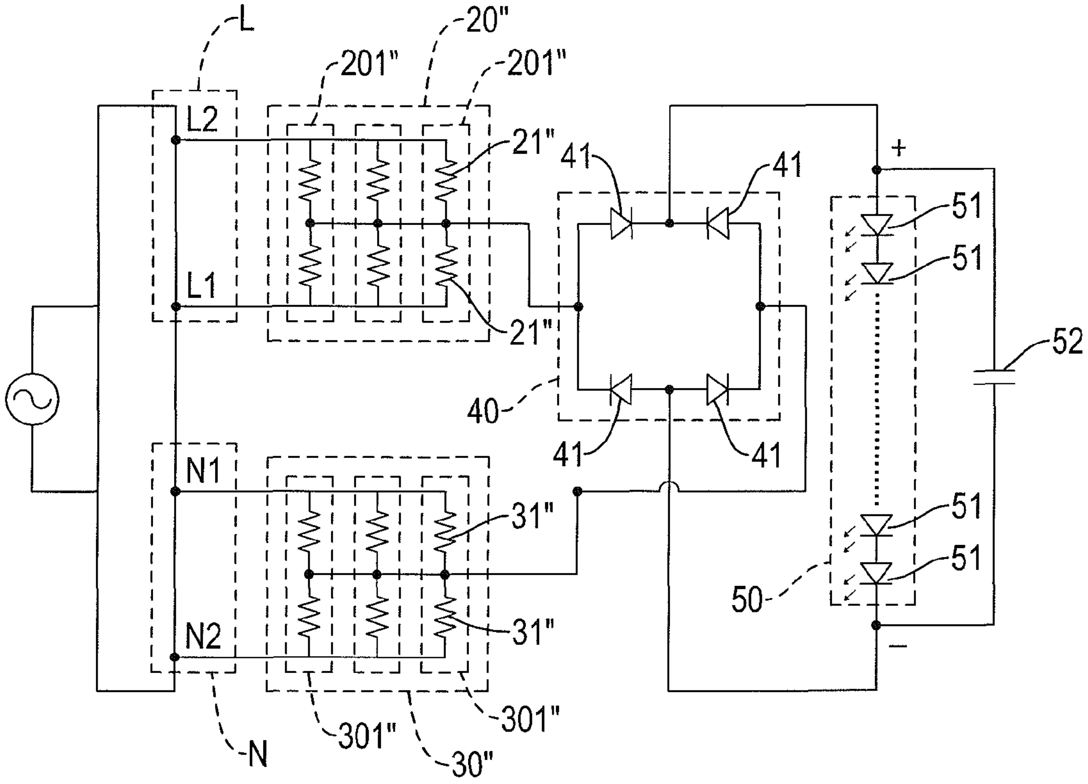
FIG. 1C is a circuit diagram of a third embodiment of an LED lighting tube in accordance with the present invention.
Figure 2:
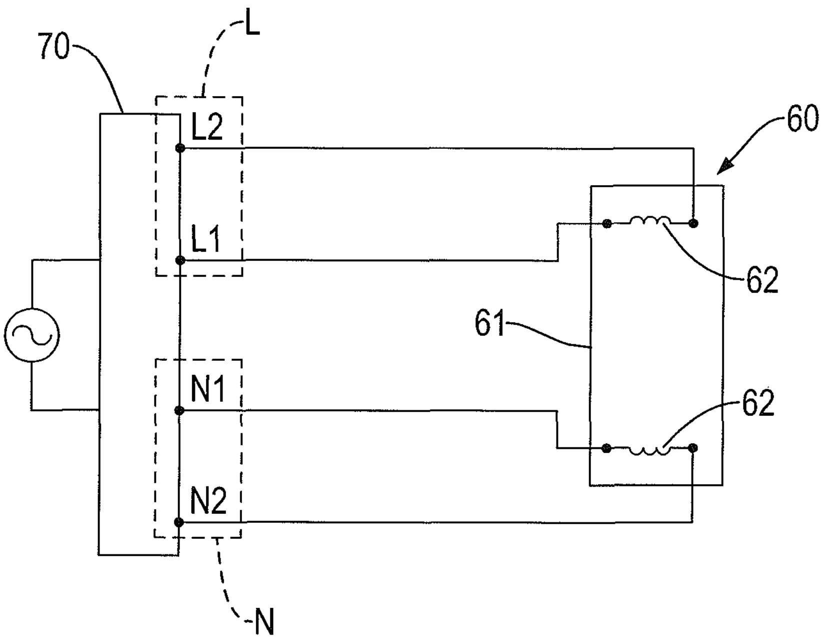
FIG.2 PRIOR ART
FIG. 2 is a circuit diagram of a conventional fluorescent tube.

Two input terminals of the first snubber circuit 20 are respectively connected to the electrode pins L1, L2, and an output terminal of the first snubber circuit 20 is connected to an input terminal of the waveform conversion circuit 40. In a preferred embodiment, the first snubber circuit 20 has a resistor 21, and a resistance value of the resistor 21 equals a resistance value of a filament before being heated. Two ends of the resistor 21 are respectively connected to the electrode pins L1, L2 of the first terminal L. That is, the resistor 21 is connected in series between the electrode pins L1, L2 to avoid a short-circuit current due to no impedance between the electrode pins L1, L2. Furthermore, each input terminal of the first snubber circuit 20 is also the output terminal of the first snubber circuit 20. In addition, in another preferred embodiment as shown in FIG. 1B, the first snubber circuit 20' has two resistors 21' connected in series. A sum of resistance values of the two resistors 21' equals a resistance value of a filament before being heated. Two ends of the connected resistors 21' are the input terminals of the first snubber circuit 20', and a connected node of the resistors 21' is the output terminal of the first snubber circuit 20'. The resistors 21' can also avoid the short-circuit current due to no impedance between the electrode pins L1, L2. In addition, in another preferred embodiment as shown in FIG. 1C, the first snubber circuit 20" has multiple resistor circuits 201", and each resistor circuit 201" has two resistors 21" connected in series between the electrode pins L1, L2. That is, the resistor circuits 201" are connected in parallel, and the resistors 21" are connected in series and parallel. A connected node between the electrode pin L1 and the resistor circuits 201" is an input end of the first snubber circuit 20", and a connected node between the electrode pin L2 and the resistor circuits 201" is another input end of the first snubber circuit 20". Furthermore, a connected node between the two resistors 21" of each resistor circuit 201" is the output terminal of the first snubber circuit 20". A sum of resistance values of the resistors 21" equals a resistance value of a filament before being heated. The first snubber circuit 20" has the resistors 21" connected in series and parallel to increase a heat dissipation area of the first snubber circuit 20".

Input terminals of the second snubber circuit 30 are respectively connected to the electrode pins N1, N2 of the second terminal N, and an output terminal of the second snubber circuit 30 is connected to an input terminal of the waveform conversion circuit 40. In a preferred embodiment, the second snubber circuit 30 has a resistor 31, and a resistance value of the resistor 31 equals a resistance value of a filament before being heated. Two ends of the resistor 31 are respectively connected to the electrode pins N1, N2 of the second terminal N. That is, the resistor 31 is connected in series between the electrode pins N1, N2 to avoid a short-circuit current due to no impedance between the electrode pins N1, N2. Furthermore, each end of the input terminals of the second snubber circuit 30 is also the output terminal of the second snubber circuit 30. In addition, in another preferred embodiment as shown in FIG. 1B, the second snubber circuit 30' has two resistors 31' connected in series. A sum of resistance values of the two resistors 31' equals a resistance value of a filament before being heated. Two ends of the connected resistors 31' are the input terminals of the second snubber circuit 30', and a connected node of the resistors 31' is the output terminal of the second snubber circuit 30'. The resistors 31' can also avoid the short-circuit current due to no impedance between the electrode pins N1, N2. In addition, in another preferred embodiment as shown in FIG. 1C, the second snubber circuit 30" has multiple resistor circuits 301", and each resistor circuit 301" has two resistors 31" connected in series between the electrode pins N1, N2. That is, the resistor circuits 301" are connected in parallel, and the at least two resistors 31" are connected in series and parallel. A connected node between the electrode pin N1 and the resistor circuits 301" is an input end of the second snubber circuit 30", and a connected node between the electrode pin N2 and the resistor circuits 301" is another input end of the second snubber circuit 30". Furthermore, each input terminal of the second snubber circuit 30" is also the output terminal of the second snubber circuit 30". A sum of resistance values of the at least two resistors 31" equals a resistance value of a filament before being heated. The second snubber circuit 30" has the at least two resistors 31" connected in series and parallel to increase a heat dissipation area of the second snubber circuit 30".

The waveform conversion circuit 40 has multiple rectifier diodes 41 to form a half-bridge circuit or a full-bridge rectifier circuit. Two input terminals of the waveform conversion circuit 40 are respectively connected to the output terminal of the first snubber circuit 20 and the output terminal of the second snubber circuit 30. The recovery time of each rectifier diode 41 is under 2.5 us, which is obtained by taking a frequency of the electronic ballast 10, which is 40 KHZ, as a basis and taking 1/10 of a cycle of the electronic ballast 10 to avoid overheating. A preferred rectifier diode 41 has a recovery time under 1 us, or the recovery time is 0.2 us.

Two ends of the LED light string 50 are respectively connected to two output terminals of the waveform conversion circuit 40. The LED light string 50 has multiple LED units 51. A capacitor 52 is connected in parallel with the LED light string 50. The capacitor 52 is charged when the AC power goes up from low voltage to high voltage, and then releases the charge when the AC power goes down from high voltage to low voltage to solve a problem of stroboscopic effect when the LED light string 50 starts to glow. In general, the frequency of the stroboscopic effect is high (20 KHZ to 40 KHZ), and the stroboscopic effect can be eliminated by the capacitor 52. A preferred capacitance of the capacitor 52 is between 1 uF and 20 uF due to the high frequency of the electronic ballast 10. Only a low capacitance of the capacitor 52 is needed. The capacitor is not necessary if a high frequency flicker can be tolerated.

A user mounts the LED lighting tube in a conventional fluorescent tube holder and turns on the power. With the first snubber circuit 20, 20', 20", at least one resistor 21, 21' is connected in series between the electrode pins L1, L2 of the first terminal L. With the second snubber circuit 30, 30', 30", at least one resistor 31, 31', 31" is connected in series between the electrode pins N1, N2 of the second terminal N. The electronic ballast 10 having a preheat current regards the resistors 21, 21', 21", 31, 31', 31" as filaments of a conventional fluorescent tube. That is, the resistors 21, 21', 21", 31, 31', 31" simulate the filaments of the fluorescent tube. The preheat current of the electronic ballast 10 flows through the resistors 21, 21', 21", 31, 31', 31" connected to the first terminal L and the second terminal N. The preheat current is restricted by the resistors 21, 21' 21", 31, 31', 31" to avoid a short-circuit current damaging the electronic ballast 10 and the LED lighting tube due to no impedance in the first terminal L and the second terminal N.

Even though the resistors 21, 21', 31, 31' are drawn as a lumped resistor, in practice each individual resistor can be made of a string of resistors in parallel or in series, as long as the sum of the resistor string equal the desired value. To distribute the resistor as a string of parallel or series resistors can dissipate the heat more evenly in a large area.

In conclusion, principles of the first embodiment, the second embodiment and the third embodiment are almost the same. The three embodiments of the LED lighting tube in accordance with the present invention both avoid a generation of a short-circuit current between the electrode pins L1, L2, N1, N2. In addition, the embodiments also have a rectifying effect.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An LED lighting tube compatible with an electronic ballast having first, second, third and fourth AC output terminals, with the LED lighting tube comprising:

a first terminal having two electrode pins adapted to be connected to the first and second AC output terminals of the electronic ballast;

a second terminal having two electrode pins adapted to be connected to the third and fourth AC output terminals of the electronic ballast;

two snubber circuits respectively connected to the first and second terminals, with two input terminals of each snubber circuit respectively connected to the two electrode pins of a corresponding terminal; with each snubber circuit having at least one resistor connected in series between the two electrode pins of the corresponding terminal;

a waveform conversion circuit having multiple rectifier diodes and having input terminals connected to output terminals of the two snubber circuits, wherein a recovery time of each rectifier diode is under 2.5 us; and at least one LED light string having two ends respectively connected to output terminals of the waveform conversion circuit, wherein each one of the at least one LED light string comprises multiple LED units connected in series.

2. The LED lighting tube as claimed in claim 1, wherein the waveform conversion circuit is a full-bridge rectifier circuit.

3. The LED lighting tube as claimed in claim 1, wherein each snubber circuit comprises a resistor connected in series between corresponding electrode pins, and wherein an end of the resistor is the output terminal of the snubber circuit.

4. The LED lighting tube as claimed in claim 2, wherein each snubber circuit comprises a resistor connected in series between corresponding electrode pins, and wherein an end of the resistor is the output terminal of the snubber circuit.

5. The LED lighting tube as claimed in claim 1, wherein each snubber circuit comprises two resistors connected in series between corresponding electrode pins, and wherein a connected node between the resistors is the output terminal of the snubber circuit.

6. The LED lighting tube as claimed in claim 2, wherein each snubber circuit comprises two resistors connected in series between corresponding electrode pins, and wherein a connected node between the two resistors is the output terminal of the snubber circuit.

7. The LED lighting tube as claimed in claim 1, wherein each snubber circuit further comprises multiple resistor circuits connected in parallel, with each resistor circuit having two resistors connected in series between corresponding electrode pins, and wherein a connected node between the two resistors of each resistor circuit is the output terminal of a corresponding snubber circuit.

8. The LED lighting tube as claimed in claim 2, wherein each snubber circuit further comprises multiple resistor circuits connected in parallel, with each resistor circuit having two resistors connected in series between corresponding electrode pins, and wherein a connected node between the two resistors of each resistor circuit is the output terminal of a corresponding snubber circuit.

9. The LED lighting tube as claimed in claim 1, further comprising a capacitor connected in parallel with the at least one LED light string.

10. The LED lighting tube as claimed in claim 2, further comprising a capacitor connected in parallel with the at least one LED light string.

11. The LED lighting tube as claimed in claim 3, further comprising a capacitor connected in parallel with the at least one LED light string.

12. The LED lighting tube as claimed in claim 4, further comprising a capacitor connected in parallel with the at least one LED light string.

13. The LED lighting tube as claimed in claim 5, further comprising a capacitor connected in parallel with the at least one LED light string.

14. The LED lighting tube as claimed in claim 6, further comprising a capacitor connected in parallel with the at least one LED light string.

15. The LED lighting tube as claimed in claim 7, further comprising a capacitor connected in parallel with the at least one LED light string.

16. The LED lighting tube as claimed in claim 8, further comprising a capacitor connected in parallel with the at least one LED light string.

17. The LED lighting tube as claimed in claim 1, wherein the recovery time of each rectifier diode is under 1 us.

18. The LED lighting tube as claimed in claim 2, wherein the recovery time of each rectifier diode is under 1 us.

19. The LED lighting tube as claimed in claim 3, wherein the recovery time of each rectifier diode is under 1 us.

20. The LED lighting tube as claimed in claim 4, wherein the recovery time of each rectifier diode is under 1 us.

21. The LED lighting tube as claimed in claim 5, wherein the recovery time of each rectifier diode is under 1 us.

22. The LED lighting tube as claimed in claim 6, wherein the recovery time of each rectifier diode is under 1 us.

23. The LED lighting tube as claimed in claim 7, wherein the recovery time of each rectifier diode is under 1 us.

24. The LED lighting tube as claimed in claim 8, wherein the recovery time of each rectifier diode is under 1 us.

* * * * *